(12) United States Patent
Craik

(10) Patent No.: US 7,076,532 B2
(45) Date of Patent: Jul. 11, 2006

(54) SYSTEM AND METHOD FOR STORING AND RETRIEVING EQUIPMENT INSPECTION AND MAINTENANCE DATA

(76) Inventor: Ron Craik, 6 Tamarac Crescent S.W., Calgary, Alberta (CA) T3C 3B6

(*) Notice: Subject to any disclaimer, the term of this patent is extended or adjusted under 35 U.S.C. 154(b) by 629 days.

(21) Appl. No.: 09/986,801

(22) Filed: Nov. 13, 2001

(65) Prior Publication Data

US 2002/0095476 A1    Jul. 18, 2002

(30) Foreign Application Priority Data

Jan. 15, 2001    (CA) .................................... 2330697

(51) Int. Cl.
  *G06F 15/16* (2006.01)
  *G06F 7/00* (2006.01)
  *G06F 19/00* (2006.01)
(52) U.S. Cl. ..................... 709/217; 702/184; 707/10; 707/104.1
(58) Field of Classification Search ........ 709/227–229, 709/203, 212–219; 701/22, 29–35; 382/141; 307/9.1–10.1; 719/102; 702/182–186; 707/104.1, 707/204, 1–10, 104; 455/67.11; 235/375
See application file for complete search history.

(56) References Cited

U.S. PATENT DOCUMENTS 4,982,371 A    1/1991 Bolan et al.

(Continued)

FOREIGN PATENT DOCUMENTS

CA    2393395 A1    7/2001

(Continued)

OTHER PUBLICATIONS

U.S. Appl. No. 60/231,913, filed Sep. 11, 2000, Thompson.*

(Continued)

*Primary Examiner*—David Wiley
*Assistant Examiner*—Joseph E. Avellino
(74) *Attorney, Agent, or Firm*—Donald V. Tomkins

(57) ABSTRACT

An inspection and maintenance data storage and retrieval system features uniquely identified read/write memory buttons mounted in or on an equipment unit such as an aircraft, in association with specific components of the equipment unit. Technical information useful for inspection and maintenance of the components, plus historical inspection and maintenance information, is stored in a central database computer remote from the equipment unit. A memory button probe, used in conjunction with a portable computer, enables storage on the memory buttons of information relating to inspection and maintenance carried out on the corresponding equipment components, as well as technical information related to the components. The portable computer is connected to the central database computer, preferably through a wireless Internet connection, thus enabling downloading of technical information from the central database to the portable computer at the point of inspection or maintenance. Information relating to each inspection and maintenance task may be downloaded to the central database computer via the portable computer. The central database computer may be a network server providing authorized users with access to current maintenance and operational status information for the equipment units supported by the system.

8 Claims, 1 Drawing Sheet

U.S. PATENT DOCUMENTS

| | | | |
|---|---|---|---|
| 5,091,771 A | | 2/1992 | Bolan et al. |
| 5,671,158 A | | 9/1997 | Fournier et al. |
| 5,844,473 A | | 12/1998 | Kaman |
| 5,884,202 A | * | 3/1999 | Arjomand .................... 701/29 |
| 5,931,877 A | | 8/1999 | Smith et al. |
| 5,949,049 A | | 9/1999 | McCarrick et al. |
| 5,950,149 A | * | 9/1999 | Fieramosca et al. ........ 702/183 |
| 6,078,874 A | | 6/2000 | Piety et al. |
| 6,101,433 A | | 8/2000 | Flicker, Jr. |
| 6,122,575 A | * | 9/2000 | Schmidt et al. ................ 701/29 |
| 6,170,742 B1 | * | 1/2001 | Yacoob ....................... 235/375 |
| 6,216,527 B1 | * | 4/2001 | Beecham et al. .......... 73/23.31 |
| 6,314,422 B1 | * | 11/2001 | Barker et al. .................. 707/10 |
| 6,370,455 B1 | * | 4/2002 | Larson et al. .................. 701/33 |
| 6,417,760 B1 | * | 7/2002 | Mabuchi et al. ............. 340/5.3 |
| 6,529,620 B1 | * | 3/2003 | Thompson .................. 382/141 |
| 6,556,904 B1 | * | 4/2003 | Larson et al. .................. 701/33 |
| 6,616,034 B1 | * | 9/2003 | Wu et al. .................... 235/375 |
| 6,757,521 B1 | * | 6/2004 | Ying ....................... 455/67.11 |
| 6,810,406 B1 | * | 10/2004 | Schlabach et al. .......... 707/201 |
| 6,859,757 B1 | * | 2/2005 | Muehl et al. ............... 702/184 |
| 6,892,936 B1 | * | 5/2005 | Riggert et al. .............. 235/375 |
| 2002/0026455 A1 | | 2/2002 | Toothman, III et al. |
| 2002/0167393 A1 | * | 11/2002 | Mabuchi et al. ............. 340/5.3 |
| 2002/0195503 A1 | * | 12/2002 | Allen et al. ................. 239/144 |

FOREIGN PATENT DOCUMENTS

WO      WO 01/52152 A1     7/2001

OTHER PUBLICATIONS

Dallas Semiconductor Corporation, Cryptographic Module Security Policy for the Dallas Semiconductor DS1954B Crypto iButtonTM, dated Aug. 16, 1999 (17 pages).

"Problems to Spare", by Douglas W. Nelms, AirTransport World, Nov. 1998, pp. 96, 99.

"MiniButtons Track Aircraft Components", Aiforce, Winter 1998, p. 36.

"Knowledge of Hazardous Chemicals in the Aviation Workplace Can Help Prevent Work-related Illness and Injury", Flight Safety Foundation Aviation Mechanics Bulletin, Jul.-Aug. 1997, pp. 22-23.

"ButtonMemory Keeps it All Forever", Aviation Week & Space Technology, Oct. 19, 1998, p. 14.

"Electronic Logbook", by Paul Proctor, "Industry Outlook", Aviation Week & Space Technology, Oct. 27, 1997, p. 13.

"Paper Out, Memory In", by David Mulholland, Navy Times, Jun. 8, 1998.

"Minibuttons Used to Store Data", Overhaul & Maintenance, Jan.-Feb. 1998, p. 75.

"Automatic Identification Technology: A Cost-Effective Tool for the Configuration and Repairable Asset Manager", Florida Log '97 Proceedings Logisticians by Choice Expanding Personal Horizons, Feb. 7-8, 1997.

* cited by examiner

SYSTEM AND METHOD FOR STORING AND RETRIEVING EQUIPMENT INSPECTION AND MAINTENANCE DATA

FIELD OF THE INVENTION

The present invention relates to methods and apparatus for storing and retrieving information regarding inspection and maintenance of equipment, particularly transportation equipment including aircraft, ships, and land vehicles. The invention also relates in particular to methods and apparatus for storing such information on the equipment to which it pertains.

BACKGROUND OF THE INVENTION

Many types of equipment require ongoing inspection and maintenance to ensure that the equipment is in proper and safe working order. This is true for stationary industrial equipment, and also for aircraft and other mobile equipment transportation equipment. Regular inspection and maintenance may be required not only for practical and economic reasons, but may also be mandatory for regulatory compliance. For example, in order to maintain airworthiness status, specific components and assemblies of both private and commercial aircraft must undergo inspection, plus maintenance or overhaul as required, at regulated intervals. These intervals are typically established in terms of service hours on the component in question, or service hours on the aircraft.

A commercial airliner may have dozens of components requiring regular inspection and maintenance, and this work must be performed with painstaking care by highly qualified technicians. At each inspection point, a technician must gain direct visual and physical access to the component being inspected. Gaining such access may be a complicated exercise in itself. For example, inspection hatches for rudder and elevator components on a modern jetliner may be located high above the ground, so a technician may require scaffolding or mechanized equipment (e.g., a "cherry picker") in order to gain access to such components.

Having gained access to a particular component, the technician must know exactly what steps need to be taken to inspect the component properly, and must know what maintenance or repair activities are required in the circumstances, according to the condition of the component as determined during the inspection, and the time interval since the previous inspection or maintenance procedure. Accordingly, the technician may need to have on-the-spot access to relevant provisions of the aircraft's maintenance manuals, including technical specifications and inspection checklists, as well as any work orders which may have been prepared for the specific inspection. As well, it may often be necessary or desirable to have access to records of previous inspections, service, and maintenance.

The technician might conceivably have this information in his or her memory, but it is not desirable to rely on memory in connection with work in respect of which an error might jeopardize passenger safety. Therefore, the technician may need to carry several reference documents during the inspection. If the technician has forgotten any particulars of the inspection or maintenance to be performed, or has forgotten to bring required reference documents to the point of inspection, he or she may need to leave the inspection point to obtain or retrieve the necessary information, and then return to the inspection point to complete the required inspection or maintenance service.

Once the inspection has been made, and any necessary maintenance has been completed, the technician usually will need to record certain particulars of the work; e.g., date and time of inspection, identity of the technician, and details of maintenance or repairs performed. In addition, it will typically be necessary or desirable to transfer such information to a central record-keeping facility so that the maintenance history and the current serviceability status of the aircraft can be conveniently reviewed. For many aircraft operators, such as commercial airlines and military air forces, it may be particularly efficient and desirable to have this inspection and maintenance information stored in a computer database remote from the aircraft in question, and to have the information transferred to the database as soon as possible after the inspection or maintenance work has been completed, in order to have access to up-to-the-minute information on the condition of the aircraft and its availability for service.

This desirable objective may be difficult to achieve satisfactorily where the subject information must be transferred to the central record-keeping facility from a technician's handwritten notes, because there may sometimes be a delay between the time of the inspection or maintenance and the time of entry in the central records, even when the technician acts with reasonable diligence. In other cases, the technician may inadvertently neglect or forget to enter the information until a considerable time after the inspection or maintenance was performed, and in the worst case the information may never get entered at all. In addition, there is the risk that the information in the technician's notes will be transferred inaccurately or incompletely, not to mention the further risk that the information might be lost completely if the technician's notes are accidentally misplaced or destroyed before the information transfer can be carried out.

Because of factors such as those outlined above, security and storage of information related to inspection and maintenance of aircraft and other types or equipment, as well as timely access to information required for such inspection and maintenance, can be inconvenient and inefficient, and correspondingly time-consuming and expensive. One example of prior attempts to address these problems is U.S. Pat. No. 5,931,877, issued on Aug. 3, 1999 to Smith (et al.), which discloses a system providing electronic access to a central data warehouse which stores information from technical manuals relating to the various pieces of equipment being supported by the system, as well as historical maintenance information for specific pieces of equipment. Maintenance technicians may acquire access to the information in the central data warehouse by use of a hand-held computer, or portable maintenance aid ("PMA"), via wireless transceivers or high-speed land lines. The technicians therefore do not need access to hard copies of the technical and historical maintenance information for the equipment they are working on, and they can transmit data regarding their maintenance tasks back to the central data warehouse through use of the PMA.

The PMA forms part of a fundamental element of the Smith system, namely, a test means for identifying failed equipment components. More specifically, the test means provides for automated downloading, to the PMA, of built-in test (or "BIT") data available from a bus in particular equipment units such as sophisticated military aircraft and weaponry components. Accordingly, the Smith system's practical usefulness is therefore best found in association with such specialized equipment adapted for BIT logic analysis, and it is not readily and economically adaptable for use with other types of equipment. Perhaps the most significant drawback of the Smith system, however, is the fact that technicians' work will be seriously hampered or delayed in the event of breakdown of communications with the central data warehouse, which will typically be the technicians' only convenient source of reliable technical and historical information which may be needed to complete a particular maintenance task.

For the foregoing reasons, there is a need for a method and apparatus for recording and storing inspection and maintenance information in a central data storage facility promptly upon completion of the inspection or maintenance work, without requiring transfer of the information from handwritten notes. In addition, there is a need for a method and apparatus for providing paperless access to inspection and maintenance reference information, such as information in technical service manuals, or historical inspection and maintenance information, directly at the point of inspection or maintenance. Furthermore, there is a need for a method and apparatus for storage of technical and historical inspection and maintenance information directly on the equipment in question, preferably in the immediate vicinity of the point of inspection or maintenance. The present invention is directed to these needs.

BRIEF SUMMARY OF THE INVENTION

In general terms, the present invention provides a system and method whereby a technician performing equipmentinspectionor maintenance services, particularly mobile equipment such as aircraft, can have direct paperless access, at the actual point of inspection or maintenance, to historical maintenance records and reference information pertinent to the equipment unit being inspected or serviced. In accordance with the invention, such records and information are stored in a central database remote from the equipment unit, and the technician may access the database by means of a portable computing device linked to the database. In addition, a portion of the pertinent records and information may be stored in one or more read-write memory chips, each encased in a memory button mounted in or on the equipment unit, preferably in locations conveniently proximate to corresponding points of regular inspection and maintenance. As well, the information may be stored in the memory of the portable computing device.

In accordance with the invention, the technician may use a memory button probe, electronically linked to the portable computing device, to read the information stored on the memory buttons, and also to record new information on the memory buttons relating to the inspection or maintenance task carried out by the technician on the occasion in question. The technician may then update the central database by transferring the information on the memory buttons to the database via the memory button probe and the portable computing device. Because the database is updated promptly upon completion of each inspection and maintenance task, persons accessing the database may obtain up-to-the-minute information regarding the equipment unit's state of maintenance and its availability for deployment.

Accordingly, in one aspect the present invention is a system for accessing and storing data pertaining to inspection and maintenance of an equipment unit, said system comprising:

(a) one or more memory buttons, each said memory button being adapted to permit electronic storage of data therein, and to permit reading of data stored therein;

(b) a memory button probe, said probe being adapted for transferring data to, and for reading data stored in, the said one or more memory buttons;

(c) a portable computing device having a memory;

(d) a first data transfer link, whereby the portable computing device is in electronic communication with the memory button probe;

(e) a central computer having a database for storing data relating to the equipment unit, said central computer being at a location remote from the equipment unit; and (f) a second data transfer link, whereby the portable computing device is in electronic communication with the central computer and database;

wherein each memory button is mounted on or in the equipment unit.

The portable computing device may be a laptop computer, but in the preferred embodiment of the system, the portable computing device will be a "personal digital assistant", or PDA. The second data transfer link may be a physical electronic connection, or it may be in the form of a wireless connection. In the preferred embodiment, the second data transfer link will be a wireless connection via a computer network such as the Internet, with data transmissions across such connection being password-protected and encryptable. In a further embodiment, the second data transfer link will be a connection through a telecommunications satellite system.

In the preferred embodiment of the system, the central computer will be a network server accessible to authorized user computers through a computer network, which may be a local area network (LAN), or a wide area network (WAN) such as the Internet. In the preferred embodiment, the network server will be protected by a firewall to prevent intrusion into the server by hackers. As well, access to the network server by authorized user computers will be password-protected.

In another aspect, the invention is a method of storing and retrieving inspection and maintenance information regarding an equipment unit, said method comprising the steps of:

(a) providing a memory button, said memory button being adapted to permit electronic storage of data therein, and to permit reading of data stored therein;

(b) installing said memory button on or in the equipment unit in convenient proximity to a selected inspection and maintenance point;

(c) providing a memory button probe adapted for transferring data to, and for reading data stored in, the memory button;

(d) providing a portable computing device having a memory, and having a first data transfer link whereby said portable computing device is in electronic communication with the memory button probe;

(e) providing, at a location remote from the equipment unit, a central computer having a database, said central computer having a second data transfer link whereby the central computer is in electronic communication with the portable computing device;

(f) as desired, storing technical information relating to the equipment unit in the database of the central computer;

(g) as desired, storing technical information relating to the equipment unit in the memory button;

(h) as desired, engaging the memory button probe with the memory button, so as to read selected data stored therein, and to transmit said selected data via said first data transfer link to the portable computing device;

(i) as desired, transmitting a signal from the portable computing device to the central computer via said second data transfer link, instructing the central computer to transmit selected data from the database to the portable computing device via the second data transfer link;

(j) performing an inspection or maintenance task on the equipment unit;

(k) entering task performance information into the portable computing device relating to the performance of said inspection or maintenance task;

(l) electronically transmitting a signal, corresponding to said task performance information, from the portable computing device to the memory button, via said first data transfer link and the memory button probe, so as to store said task performance information on the memory button; and (m) electronically transmitting a signal, corresponding to said task performance information, from the portable computing device to the central computer, via said second data transfer link, so as to store said task performance information in the database.

The portable computing device may be a laptop computer, but in the preferred embodiment of the method, the portable computing device will be a PDA. The second data transfer link may be a physical electronic connection, or it may be in the form of a wireless connection. In the preferred embodiment, the second data transfer link will be a wireless connection via a computer network such as the Internet, with data transmissions across such connection being password-protected and encryptable. In a further embodiment, the second data transfer link will be a connection through a telecommunications satellite system.

In the preferred embodiment of the method, the central computer will be a network server accessible to authorized user computers through a computer network, which may be a local area network (LAN), or a wide area network (WAN) such as the Internet. In the preferred embodiment, the network server will be protected by a firewall to prevent intrusion into the server by hackers. As well, access to the network server by authorized user computers will be password-protected. Accordingly, in the preferred embodiment, the method of the invention further comprises the step of accessing the database of the computer network server from a user computer via connection to a computer network, plus the step of making a back-up copy of information from the database on the user computer.

BRIEF DESCRIPTION OF THE DRAWING

Embodiments of the invention will now be described with reference to the accompanying figure, in which numerical references denote like parts, and in which.

DETAILED DESCRIPTION OF THE PREFERRED EMBODIMENT

Figure 1:
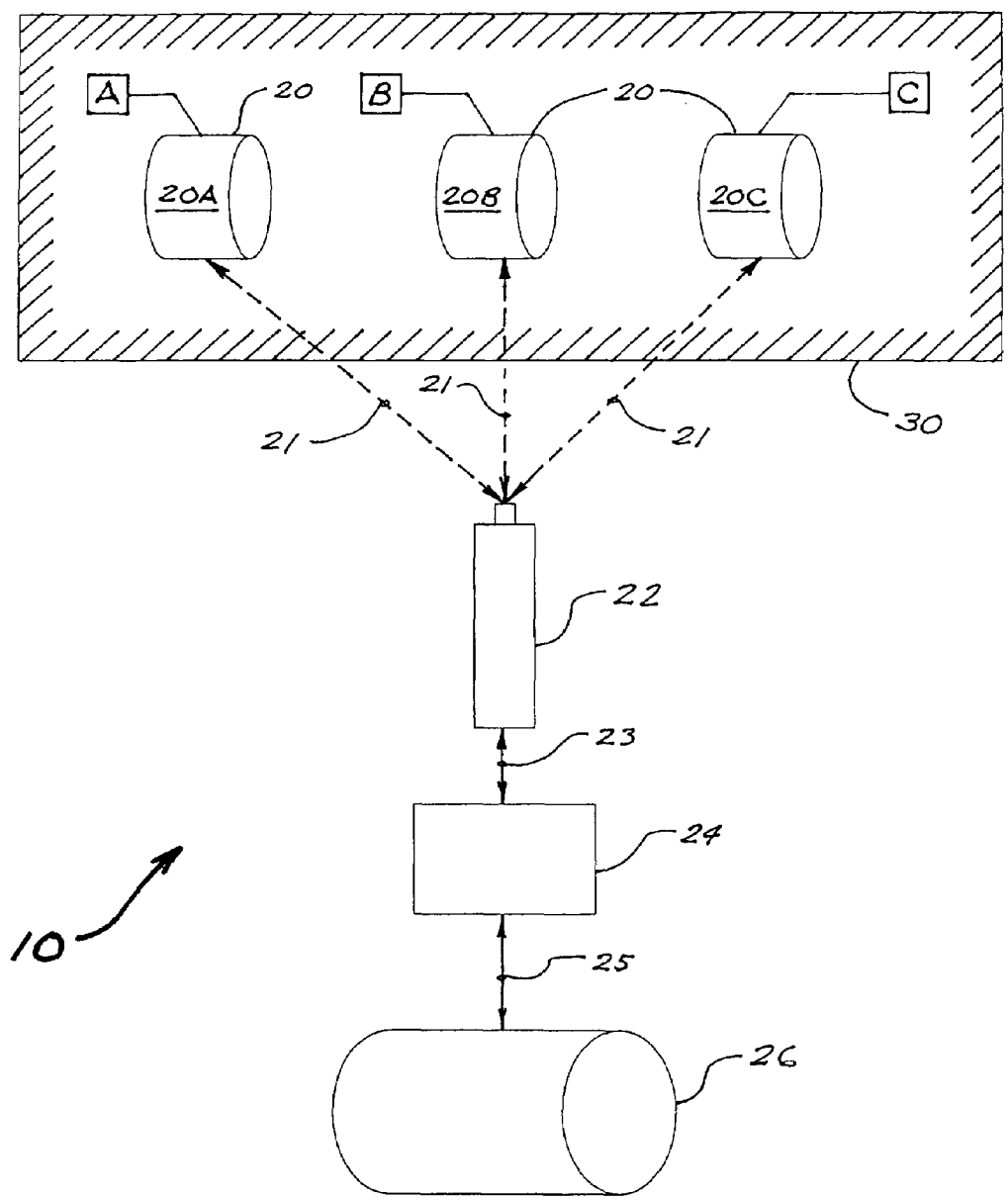
FIG. 1 is a schematic block diagram of an equipment inspection and maintenance data storage and retrieval system according to the present invention.

Referring to FIG. 1, the system of the present invention, conceptually indicated by reference numeral 10, includes one or more read/write memory buttons 20 installed at selected locations in or on an equipment unit 30. The memory buttons 20 are computer chips sealed in an armoured container (typically stainless steel), and each has a unique and unalterable identification number recorded directly onto the chip. Memory buttons are available with variable features and capabilities, such as the "iButton"™ manufactured by Dallas Semiconductor Corp. The memory buttons 20 used for purposes of the present invention have "read/write" chips; i.e., the chips have a memory which can be read, and data can also be written into the memory.

Reading the memory buttons 20 and writing new data onto them is accomplished using a suitable memory button probe 22 connected to a computing device. One known example of a memory button probe is the "Blue Dot Receptor"™ manufactured by Dallas Semiconductor Corp. Each memory button 20 has a contact means which, when engaged by a corresponding contact means associated with the memory button probe 22, creates a data transfer link whereby data stored in the memory button 20 may be read, or whereby data may be transferred to the memory button 20. In FIG. 1, engagement between the corresponding contact means of the memory button probe 22 and a selected memory button 20, as well as the resulting transfer of data to or from the memory button 20, is conceptually denoted by the broken lines indicated by reference numeral 21.

The system 10 includes a portable computing device 24 having a memory, and the portable computing device 24 is electronically connectable to the memory button reader 22 by way of a first data transfer link 23. The first data transfer link 23 may be an integral component of the memory button reader 22, or it may be a separate wired connection. The portable computing device 24 may be a laptop computer. However, in the preferred embodiment, the portable computing device 24 will be a hand-held computing device such as a PDA. Several types of PDAs are readily available, such as the PALM PILOT line of products manufactured by Palm, Inc. Whatever form the portable computing device 24 may assume, it is programmed with software appropriate to enable receipt of information from the memory buttons 20 via the memory button reader 22, and to enable transfer of information to the memory buttons 20 via the memory button reader 22.

Also provided is a central database computer 26, which is connectable to the portable computing device 24 by way of a second data transfer link 25. In the preferred embodiment, the central database computer 26 will be a Internet server, and may be located remotely from the equipment unit 30. The central database computer 26 is configured and programmed to receive and store data relating to the equipment unit 30, including technical specifications and procedural information from operation and maintenance manuals for the equipment unit 30, plus historical information regarding previous inspections and maintenance work carried out in connection with the equipment unit 30. As well, the central database computer 26 can receive signals from the portable computing device 24 via the second data transfer link 25 requesting information from the database to be downloaded to the portable computing device 24. In the preferred embodiment, both the portable computing device 24 and the central database computer 26 are programmed with encryption and decryption software to maximize security of data transmissions.

The second data transfer link 25 may be a hard-wired connection to the central database computer 26, either directly or through a computer network such as the Internet. In the preferred embodiment, the second data transfer link 25 will be a wireless link via the Internet. In another embodiment, the second data transfer link 25 will be a wireless communications link through a telecommunications satellite system.

In the preferred embodiment, the central database computer 26 will be a network server accessible to computers of authorized users through a computer network, which may be a local area network (LAN), or a wide area network (WAN) such as the Internet. In the preferred embodiment, the network server will be protected by a firewall to prevent intrusion by hackers. As well, access to the network server by authorized user computers will be password-protected.

The operation and advantages of the method of the present invention may be readily understood from the following description. One or more memory buttons 20 are installed at selected locations in or on an equipment unit 30. The equipment unit 30 may be any piece of equipment, but the invention has particularly beneficial application to mobile equipment units such as aircraft. Advantageously, the memory buttons 20 may be installed in locations proximate to components on the equipment unit 30 which require inspection or maintenance at particular intervals. A typical commercial airliner, for instance, has a large number of components which must be inspected, and serviced as necessary, on a regular basis in order to maintain the aircraft's airworthiness status. The unique identification number of each memory button 20 may be recorded (in the central database computer 26, for example) as correlating to a specific component or location on the equipment unit 30. For exemplary purposes, if memory buttons are installed in association with components A, B, and C of a particular equipment unit 30, the memory button associated with component A may be referred to as memory button 20A, the memory button associated with component B may be referred to as memory button 20B, and so on, as indicated in FIG. 1.

When a technician wishes to inspect or service component A, he or she gains access to component A as appropriate. In some cases, the technician's task may simply be to inspect component A and record the fact that this inspection has been carried out, and this recording function is completed easily in accordance with the present method. The technician engages the contact means of the memory button probe 22 with the contact means of memory button 20A, whereupon data will be written onto memory button 20A, including the date and time of contact, as well as the identity of the technician. For this purpose, the technician may be assigned an identifier, such as a password which must be entered into the portable computing device 24 in order to use the memory button probe 22. However, other ways of identifying individual technicians or users will be readily apparent to those skilled in the art, without departing from the essential concept of the invention. Continuing with the example, the information recorded onto memory button 20A may also be downloaded to the central database computer 26, by corresponding commands entered on the portable computing device 24, which is programmed with software appropriate for execution of such functions.

In a particular situation, the technician may need to complete a specific maintenance task on component A, and to make detailed records of such task. In accordance with the invention, the technician may complete the task and then make corresponding entries on the portable computing device 24, which entries are then written onto memory button 20A by means of the memory button probe 22, and also downloaded to the central database computer 26. Accordingly, the next time a technician comes to inspect or service component A, a detailed record of previous inspections and maintenance in connection with component A will be available to the technician on the spot, by downloading the information stored in memory button 20A to the portable computing device 24. This information may also be available from the central database computer 26. However, a distinct advantage of the present invention is that such historical information will always be available right at the point of inspection, even if the second data transfer link 25 or the central database computer 26, or both, happen to be inoperative for any reason.

It will commonly be necessary or desirable for a technician to make reference to technical information (such as information contained in maintenance manuals for the equipment unit 30) either before or during performance of a particular inspection or maintenance task. For example, the technician may wish to confirm technical specifications to which a particular component has to be set, to study electrical wiring diagrams, or to determine or confirm procedural steps which need to be followed to complete the task at hand. In accordance with the present invention, the technician may obtain prompt access to the required information by sending a corresponding request message from the portable computing device 24 to the central database computer 26, which in turn downloads the requested information to the portable computing device 24 whereon it may be viewed by the technician. In this way, the invention substantially eliminates the need for inspection and maintenance technicians to have access to hard copies of technical and maintenance manuals, which can be quite voluminous for complex equipment units such as commercial aircraft.

In addition, if the technician so desires, selected information downloaded from the central database computer 26 may written onto the memory buttons 20 so that it will be conveniently available to the next technician who performs inspection or maintenance on the component or components in question. The requirement or desirability of downloading reference information from the central database computer 26 for purposes of subsequent inspection or maintenance tasks may thus be reduced if not eliminated, facilitating even more convenient and expeditious execution of such tasks. Moreover, as with historical inspection and maintenance information previously discussed, downloading reference information to the memory buttons 20 provides the additional benefit that such information will always be available right at the point of inspection, even if the second data transfer link 25 or the central database computer 26, or both, happen to be inoperative for any reason. Such information may also be stored in the memory of the portable computing device 24, thus creating a further back-up copy.

In the preferred embodiment, the central database computer 26 is a network server which may be accessed by authorized users via a computer network such as the Internet. Accordingly, an authorized user may conveniently download and view up-to-date inspection and maintenance and operational status information relating to any particular equipment unit associated with the system, by connecting to the network server from a user computer virtually anywhere in the world. In addition, such authorized user may make a back-up copy of such information, thus providing even further assurance that the information will be preserved and available as needed.

In the preferred embodiment, a technician in the field will thus have direct access to the Internet, thereby obtaining a number of practical benefits. In addition to having access to technical and historical information in the central database, the technician may search other helpful resources accessible via the Internet, directly and conveniently from the portable computing device 24 which the technician has during inspection or maintenance work, even if such work is being carried out from high on a scaffold or some other unusual position. As well, the technician is able to communicate via electronic mail ("E-mail") via the portable computing device, which may be advantageous for purposes including ordering spare parts needed for the task at hand, or for seeking case-specific advice and guidance from other technical personnel who may be far away from the site of the work.

It will be readily appreciated by those skilled in the art that various modifications of the present invention may be devised without departing from the essential concept of the invention, and all such modifications are intended to be included in the scope of the claims appended hereto.

The invention claimed is:

1. A method for verifying physical access by an inspection agent to a selected component of an aircraft and for storing related in information on the selected aircraft component, said method comprising the steps of:
   (a) providing a memory button comprising a read-write memory chip sealed inside an armoured container, said memory chip having stored therein a unique and unalterable identification number, and said armoured container comprising contact means electrically connected to the memory chip;
   (b) associating the memory chip's unique identification number with the selected aircraft component;
   (c) permanently affixing the memory button to the selected aircraft component;
   (d) providing a portable computing device having a read-write memory and a user interface whereby a user may enter user-defined data and commands into said read-write memory;
   (e) providing a memory button probe in hard-wired electronic communication with the portable computing device, said memory button probe having contact means adapted for contacting engagement with the contact means of the memory button, so as to transfer data from the portable computing device to the memory button or from the memory button to the portable computing device;
   (f) associating a unique inspector code with a specific inspection agent;
   (g) gaining physical access to the memory button, while carrying both the portable computing device and the memory button probe;
   (h) by means of the user interface, entering the unique inspector code into the memory of the portable computing device;
   (i) bringing the contact means of the memory button probe into physical contact with the contact means of the memory button so as to record:
      i.1 in the read-write memory of the memory chip, the unique inspector code, plus the date and time; and
      i.2 in the memory of the portable computing device, the memory chip's unique identification number, plus the time and date;
   (j) performing a selected inspection or maintenance task on the aircraft component to which the memory button is affixed;
   (k) by means of the user interface, entering task performance information into the portable computing device relating to the completed performance of the selected inspection or maintenance task;
   (l) engaging the contact means of the memory button probe with the contact means of the memory button so as to electronically transmit a signal, corresponding to said task performance information, from the portable computing device to the memory button, and so as to store said task performance information on the memory button's read-write memory chip;
   (m) providing, at a location remote from the aircraft, a central computer having a database, said central computer being in electronic communication with the portable computing device; and
   (n) transmitting a signal from the portable computing device to the central computer, so as to store said task performance information in said database;
wherein:
   (o) the aircraft has no onboard means for reading information stored in the memory button; and
   (p) steps (g), (h), (i), (j), (k), and (l) are performed by the specific inspection agent referred to in step (f);
and wherein the database of the central computer stores technical information relating to the selected aircraft component, and wherein the method comprises the additional step of transmitting a signal from the portable computing device to the central computer, instructing the central computer to transmit, from the database to the portable computing device via the second data transfer link, selected technical information relating to the selected aircraft component.

2. The method or claim 1 wherein the portable computing device is a laptop computer.

3. The method of claim 1 wherein the portable computing device is a personal digital assistant.

4. The method of claim 1 wherein the central computer is in electronic communication with the portable computing device by means of a wireless data transfer link.

5. The method of claim 4 wherein the wireless data transfer link is a wireless connection through a computer network.

6. The method of claim 4 wherein the wireless data transfer link is a connection through a telecommunications satellite system.

7. The method of claim 1, comprising the additional step of transferring said technical information from the portable computing device to the memory button by engaging the contact means of the memory button probe with the contact means of the memory button contacting engagement of the memory button probe with the memory button.

8. The method of claim 1 wherein the memory button stores technical information relating to the selected aircraft component, and wherein the method comprises the additional step of downloading selected technical information from the memory button, for use in association with the selected inspection or maintenance task, by engaging the contact means of the memory button probe with the contact means of the memory button.

* * * * *